United States Patent
Chen et al.

(10) Patent No.: US 8,324,315 B2
(45) Date of Patent: Dec. 4, 2012

(54) AQUEOUS AROMATIC POLYURETHANE ELASTOMERIC ARTICLES AND METHOD OF FABRICATING THE SAME

(75) Inventors: Ruei-Shin Chen, Changhua County (TW); Chih-Chien Chen, Hsinchu (TW); Jer-Young Chern, Hsinchu (TW); Yih-Her Chang, Hsinchu (TW); Kai Wen Chang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 317 days.

(21) Appl. No.: 12/193,547

(22) Filed: Aug. 18, 2008

(65) Prior Publication Data

US 2008/0303192 A1 Dec. 11, 2008

Related U.S. Application Data

(62) Division of application No. 11/165,137, filed on Jun. 24, 2005, now abandoned.

(30) Foreign Application Priority Data

Dec. 28, 2004 (TW) .............................. 93140986 A

(51) Int. Cl.
*C08G 18/08* (2006.01)
*C08K 3/20* (2006.01)

(52) U.S. Cl. ........ 524/591; 524/589; 524/590; 524/839; 524/840

(58) Field of Classification Search .................. 524/589, 524/590, 591, 839, 840; 264/334
See application file for complete search history.

(56) References Cited

U.S. PATENT DOCUMENTS

| 4,496,675 | A | * | 1/1985 | Hille et al. ...................... 524/77 |
| 5,173,526 | A | * | 12/1992 | Vijayendran et al. ......... 524/457 |
| 5,977,223 | A | | 11/1999 | Ryan et al. |
| 6,017,997 | A | | 1/2000 | Snow et al. |
| 2003/0027923 | A1 | | 2/2003 | Lo et al. |
| 2005/0020767 | A1 | | 1/2005 | Lo et al. |

FOREIGN PATENT DOCUMENTS

| CN | 1351619 A | | 5/2002 |
| DE | 197 08 451 A1 | | 9/1998 |
| GB | 2 386 898 A | | 10/2003 |
| GB | 2386898 A | * | 10/2003 |
| WO | WO-00/61653 A2 | | 10/2000 |

* cited by examiner

*Primary Examiner* — Michael L Leonard
(74) *Attorney, Agent, or Firm* — Birch, Stewart, Kolasch & Birch, LLP

(57) ABSTRACT

An aqueous aromatic polyurethane elastomeric article is fabricated by an aqueous aromatic polyurethane dispersion, prepared by polyurethane prepolymers comprising wholly aromatic diisocyanates, especially toluene diisocyanate (TDI). And, a method of fabricating the elastomeric article is provided.

5 Claims, No Drawings

AQUEOUS AROMATIC POLYURETHANE ELASTOMERIC ARTICLES AND METHOD OF FABRICATING THE SAME

This application is a Divisional of application Ser. No. 11/165,137 filed Jun. 24, 2005 now abandoned, and for which priority is claimed under 35 U.S.C. §120; and this application claims priority of Application No. 093140986 filed in Taiwan, R.O.C. on Dec. 28, 2004 under U.S.C. §119; the entire contents of all are hereby incorporated by reference.

BACKGROUND OF THE INVENTION

1. Field of the Invention

The present invention relates to an elastomeric article, and more specifically to an aqueous aromatic polyurethane elastomeric article and a method of fabricating the same.

2. Brief Discussion of the Related Art

Natural rubber latex gloves are popular for use as safety gloves. Such natural rubber latex gloves, however, may cause allergies or contact dermatitis due to their composition, such as proteins allergens, and chemical substances added during the glove fabrication. To avoid these dangers, some methods have been provided, for example, reduction of natural latex quantities or replacement with hypo-allergenic polymers. Nevertheless, elastomeric articles are often uncomfortable and not easy to wear. Powdered or halogenated gloves are proved to increase lubricity of the surface of gloves and more convenience to wear. Nevertheless, the powder on surgical gloves may contaminate sterile areas and cause further complications for the patient. For use in a precise equipment in the electrical/electronic industry, powder may be a serious contaminant. Additionally, halogenated gloves may deteriorate quickly, resulting in embrittlement or color fading.

Current aqueous polyurethane (PU) gloves can provide more comfortable donnability and avoid powder problems. Those aqueous polyurethanes are made from aliphatic or cycloaliphatic diisocyantes, such as isophorone diisocyanate (IPDI), hexamethylene diisocyanate (HDI), and 4,4'-dicyclohexylmethane diisocyanate (HMDI), will give better hydrolytic resistance. Such diisocyantes, however, are expensive, increasing production cost.

Additionally, conventional aqueous polyurethane may crack during drying due to poor fusion between PU particles after dipping or coating, resulting in deterioration of original characteristics. Thus, an aqueous polyurethane elastomeric article with low cost and optimal mechanical characteristics is required to be suitable for preparation in dipping or coating.

SUMMARY OF THE INVENTION

The invention provides aqueous aromatic polyurethane elastomeric articles fabricated by an aqueous aromatic polyurethane dispersion, prepared by polyurethane prepolymers comprising wholly aromatic diisocyanates, especially toluene diisocyanate (TDI).

The invention also provides a method of fabricating aqueous aromatic polyurethane elastomeric articles, comprising the following steps. An aqueous aromatic polyurethane solution is provided. A mold is then dipped in the solution. After the mold is lifted out of the solution, an aqueous aromatic polyurethane film is formed on the mold surface. The film is then dried and cooled. After the film is stripped, an aqueous aromatic polyurethane elastomeric article is formed.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

The invention provides aqueous aromatic polyurethane elastomeric articles fabricated by an aqueous aromatic polyurethane dispersion, prepared by polyurethane prepolymers comprising wholly aromatic diisocyanates, especially toluene diisocyanate (TDI).

The aromatic diisocyanate comprises at least one aromatic ring, such as phenyl and diphenyl. Substituted groups of the aromatic ring may comprise halogen atoms, nitro, cyano, alkyl, alkoxy, alkyl halide, hydroxyl, carboxyl, amide, or amino.

The aromatic diisocyanate has formula (I) or (II):

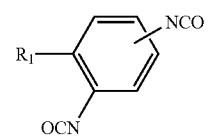

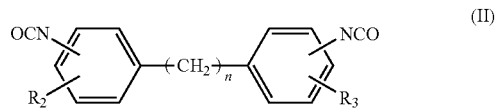

wherein $R_1$ may comprise hydrogen atom or $C_{1-6}$ alkyl, $R_2$ and $R_3$ may be the same or different, such as hydrogen atom, $C_{1-6}$ alkyl, $C_{1-6}$ alkoxy, or $C_6$ aryl, and n may be 0~3.

The aromatic diisocyanate may comprise toluene diisocyanate (TDI), p-phenylene diisocyanate (PPDI), 4,4'-diphenylmethane diisocyanate (MDI), or p,p'-bisphenyl diisocyanate (BPDI).

The aqueous aromatic polyurethane dispersion is prepared by an aromatic diisocyanate, at least one polyol, a low-molecular weight compound with at least two functional groups capable of reacting with isocyanate groups, and a hydrophilic compound containing active hydrogen. The low-molecular weight compound has a molecular weight of 60~300.

In a method of fabricating an aqueous aromatic polyurethane elastomeric article, aqueous aromatic polyurethane solution is provided, and a mold is dipped in the solution. The mold may be ceramic, metal, plastic, or rubber. After the mold is lift out of the solution, an aqueous aromatic polyurethane film is formed on the mold surface. The film is then dried and cooled. After the film is stripped, an aqueous aromatic polyurethane elastomeric article is formed.

According to practical requirements, the aqueous aromatic polyurethane solution may comprise surfactant, thickener, humectant, stabilizing reagent, deforming agent, cross-linking agent, leveling agent, or plasticizer. The aqueous aromatic polyurethane solution is prepared as follows. An aromatic diisocyanate, polyols, a diol containing hydrophilic groups, and solvents are mixed to form a solution comprising aromatic polyurethane prepolymers. The solvent is an organic solvent having a boiling point of 50~200° C. Next, the prepolymers are dispersed in an aqueous phase of the solution and extended by a chain-extending compound such as diamine or diol. After the solvent content is reduced by low-vacuum distillation or steam distillation if necessary, the aqueous aromatic polyurethane solution with organic solvent less than 15% and solid contents of 10~65 wt % is prepared.

The low-cost and high-performance elastomeric article of the invention is prepared by aqueous aromatic polyurethane, without additional modifiers or additives. Mechanical properties of the elastomeric article may be similar to rubber or superior thereto, that is, original characteristics of aqueous aromatic polyurethane are maintained during dipping or coating.

The elastomeric article has an elongation of 150~1000%, preferably exceeding 650%, a tensile strength of 30~850 kg/cm$^2$, preferably exceeding 170 kg/cm$^2$, a 500% modulus of 10~150 kg/cm$^2$, preferably less than 70 kg/cm$^2$, and a thickness of 0.05~0.35 mm. The elastomeric article may be a glove, condom, or catheter.

According to product quality tests, an aqueous aromatic polyurethane glove fabricated by the invention provides convenience, ease, and softness. Even if worn for a long time, no allergic reactions are revealed. The gloves also provide a room temperature surface resistivity of $10^8$~$10^{10}$Ω, effectively inhibiting static electricity. Additionally, the powder-free gloves will be applied in electronics and semiconductor industry. In general glove fabrications, powdered gloves require twelve steps and 30~35 min, powder-free chlorinated gloves require 13~15 steps and 2~3 hours, while inner surface polymer-coating composite gloves require 12~15 steps and 1~2 hours. The present glove fabrication, however, merely requires 6 steps and 30 min, demanding less consumption time, occupied space, manpower, and production time. Further, long-term high-temperature cross-linking vulcanization is not necessary in these processes, which are beneficial for saving power consumption and improving competitive ability of products.

Without intending to limit it in any manner, the invention will be further illustrated by the following examples.

EXAMPLE 1

Fabrication of PU-A Elastomeric Article

An aqueous aromatic polyurethane dispersion was prepared as follows. 10.36 g dimethylol butyric acid (DMBA) and 17.39 g acetone were added to a reaction tank with nitrogen gas, reflux and stirred until a uniform phase was formed. 40.28 g mixture of 2,4-toluene diisocyante and 2,6-toluene diisocyanate with a ratio of 80:20 were then added and reacted at 60° C. for 1.5 hours. Next, 119.49 g polytetramethylene glycol (PTMEG) and 29.87 g polypropylene glycol (PPG) were added and reacted at 60° C. for 4 hours. After cooling to 50° C., 7.07 g triethyl amine (TEA) was added to neutralize for 20 min to form neutralized and hydrophilic prepolymers. 190 g such prepolymers were then rapidly added to 374.3 g deionized water and stirred at 500 rpm to disperse the prepolymers. Till the NCO value lowered to 2.66 wt %, 1.75 g ethylene diamine (EDA) was added to extend the polymer chain at room temperature for 2 hours. After acetone was removed by low-vacuum distillation, an aqueous aromatic polyurethane dispersion with 30% solid contents was prepared.

An aqueous aromatic polyurethane elastomeric article was then fabricated as follows. A ceramics mold was first dipped in an aqueous solution containing a coagulating agent, and dried at 60° C. to give a pre-treated surface. Then the mold was dipped in the aqueous aromatic polyurethane dispersion at 30° C. for 30 sec. Next, the mold was slowly lifted and rotated. An aqueous aromatic polyurethane film with a uniform thickness was formed on the mold surface. After the further procedure of drying at 90° C. for 10 min, cooling and stripping, an aqueous aromatic polyurethane elastomeric article (PU-A) was formed. The PU-A had an elongation of 700%, a tensile strength of 360 kg/cm$^2$, and a 500% modulus of 86 kg/cm$^2$.

EXAMPLE 2

Fabrication of PU-B Elastomeric Article

An aqueous aromatic polyurethane dispersion was prepared as follows. 10.36 g dimethylol butyric acid (DMBA) and 17.39 g N-methyl pyrrolidone (NMP) were added to a reaction tank with nitrogen gas, reflux and stirred until a uniform phase was formed. 38.05 g mixture of 2,4-toluene diisocyante and 2,6-toluene diisocyanate with a ratio of 80:20 were then added and reacted at 60° C. for 1.5 hours. Next, 121.27 g polytetramethylene glycol (PTMEG) and 30.32 g polypropylene glycol (PPG) were added and reacted at 60° C. for 4 hours. After cooling to 50° C., 7.07 g triethyl amine (TEA) was added to neutralize for 20 min to form neutralized and hydrophilic prepolymers. 190 g such prepolymers were then rapidly added to 293.7 g deionized water and stirred at 500 rpm to disperse the prepolymers. Till the NCO value lowered to 1.86 wt %, 1.32 g ethylene diamine (EDA) was added to extend the polymer chain at room temperature for 2 hours. An aqueous aromatic polyurethane dispersion with 35% solid contents was prepared.

An aqueous aromatic polyurethane elastomeric article was then fabricated as follows. A ceramics mold was first dipped in an aqueous solution containing a coagulating agent, and dried at 60° C. to give a pre-treated surface. Then the mold was dipped in the aqueous aromatic polyurethane dispersion at 30° C. for 30 sec. Next, the mold was slowly lifted and rotated. An aqueous aromatic polyurethane film with a uniform thickness was formed on the mold surface. After the further procedure of drying at 90° C. for 10 min, cooling and stripping, an aqueous aromatic polyurethane elastomeric article (PU-B) was formed. The PU-B had an elongation of 730%, a tensile strength of 300 kg/cm$^2$, and a 500% modulus of 60 kg/cm$^2$.

EXAMPLE 3

Fabrication of PU-C Elastomeric Article

An aqueous aromatic polyurethane dispersion was prepared as follows. 93.24 g dimethylol butyric acid (DMBA) and 156.52 g N-methyl pyrrolidone (NMP) were added to a reaction tank with nitrogen gas reflux and stirred until a uniform phase was formed. 362.51 g mixture of 2,4-toluene diisocyante and 2,6-toluene diisocyanate with a ratio of 80:20 were then added and reacted at 60° C. for 1.5 hours. Next, 1034.04 g polytetramethylene glycol (PTMEG) and 310.21 g polypropylene glycol (PPG) were added and reacted at 60° C. for 4 hours. After cooling to 50° C., 63.63 g triethyl amine (TEA) was added to neutralize for 20 min to form neutralized and hydrophilic prepolymers. 1900 g such prepolymers were then rapidly added to 2937 g deionized water and stirred at 500 rpm to disperse the prepolymers. Till the NCO value lowered to 2.58 wt %, 16.7 g ethylene diamine (EDA) was added to extend the polymer chain at room temperature for 2 hours. An aqueous aromatic polyurethane dispersion with 35% solid contents was prepared.

An aqueous aromatic polyurethane elastomeric article was then fabricated as follows. A ceramics mold was first dipped in an aqueous solution containing a coagulating agent, and dried at 60° C. to give a pre-treated surface. Then the mold was dipped in the aqueous aromatic polyurethane dispersion at 30° C. for 30 sec. Next, the mold was slowly lifted and rotated. An aqueous aromatic polyurethane film with a uniform thickness was formed on the mold surface. After the further procedure of drying at 90° C. for 10 min, cooling and stripping, an aqueous aromatic polyurethane elastomeric article (PU-C) was formed. The PU-C had an elongation of 690%, a tensile strength of 400 kg/cm$^2$, and a 500% modulus of 28 kg/cm$^2$.

Various mechanical characteristics such as elongation, tensile strength, and 500% modulus of PU-A, PU-B, and PU-C elastomeric articles provided by the invention, were compared with that of a related natural rubber latex glove. The results are illustrated in Table 1.

TABLE 1

| Sample | Elongation (%) | Tensile strength (kg/cm$^2$) | 500% modulus (kg/cm$^2$) |
|---|---|---|---|
| PU-A | 700 | 360 | 86 |
| PU-B | 730 | 300 | 60 |
| PU-C | 690 | 400 | 28 |
| Natural rubber latex glove | 730 | 300 | 60 |

The results indicate that the elastomeric articles of the invention provide similar or better mechanical characteristics than conventional materials, such as better elasticity and extensibility (higher elongation and tensile strength) and better donnability, softness, and flexibility (lower 500% modulus).

The elastomeric article fabrication provided by the invention merely requires 6 steps and 30 min, demanding less consumption time and process cost. Additionally, long-term high-temperature cross-linking vulcanization is not necessary in this fabrication, which is benefit for saving power consumption and improving competitive ability of products.

While the invention has been described by way of examples and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of fabricating an aqueous aromatic polyurethane elastomeric article fabricated by an aqueous aromatic polyurethane dispersion, prepared by polyurethane prepolymers comprising wholly aromatic diisocyanates, said wholly aromatic diisocyanates comprising one or more of toluene diisocyanate (TDI), p-phenylene diisocyanate (PPDI), 4,4'-diphenylmethane diisocyanate (MDI), or p,p' -bisphenyl diisocyanate (BPDI), said method consisting of:
  (1) providing an aqueous aromatic polyurethane solution, wherein the aqueous aromatic polyurethane solution is prepared by the following steps, comprising:
    (a) preparing a mixture comprising one or more of TDI, PPDI, MDI or BPDI, polyol, hydrophilic groups-containing diol having a molecular weight of 60-300, and solvent to form a solution comprising aromatic polyurethane prepolymers;
    (b) dispersing the prepolymers in an aqueous phase of the solution and extending the chain thereof; and
    (c) forming the aqueous aromatic polyurethane solution after the solvent content is reduced by distillation;
  (2) dipping a mold in the solution;
  (3) forming an aqueous aromatic polyurethane film on the mold surface after the mold is lift out of the solution;
  (4) drying the film at 90° C. for 10 min and cooling; and
  (5) stripping the film and forming an aqueous aromatic polyurethane elastomeric article.

2. The method as claimed in claim 1, wherein the aqueous aromatic polyurethane solution comprises surfactant, thickener, humectant, stabilizing reagent, deforming agent, cross-linking agent, leveling agent, or plasticizer.

3. The method as claimed in claim 1, wherein the mold is ceramic, metal, plastic, or rubber.

4. The method as claimed in claim 1, wherein said solution contains organic solvent in an amount of less than 15% and has a solid content of 10-65 wt %.

5. The method as claimed in claim 1, wherein the aromatic diisocyanate is a mixture of 2,4-toluene diisocyanate and 2,6-toluene diisocyanate.

* * * * *